United States Patent
Jain et al.

(10) Patent No.: US 9,306,837 B1
(45) Date of Patent: Apr. 5, 2016

(54) SOURCE IP-BASED PRUNING OF TRAFFIC TOWARD DUALLY-CONNECTED OVERLAY HOSTS IN A DATA COMMUNICATIONS ENVIRONMENT

(71) Applicant: CISCO TECHNOLOGY, INC., San Jose, CA (US)

(72) Inventors: Vipin Jain, San Jose, CA (US); Ashutosh Agrawal, Fremont, CA (US); Deepa Seshadri, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 446 days.

(21) Appl. No.: 13/789,990

(22) Filed: Mar. 8, 2013

(51) Int. Cl.
*H04L 12/28* (2006.01)
*H04L 12/761* (2013.01)

(52) U.S. Cl.
CPC ........................... *H04L 45/16* (2013.01)

(58) Field of Classification Search
CPC ......... H04L 12/56; H04L 12/00; H04L 12/04; H04L 12/16; H04L 12/18; H04L 12/22; H04L 12/24; H04L 12/26; H04L 12/32; H04L 12/34; H04L 12/44; H04L 12/64; H04L 12/72; H04L 12/74; H04L 12/745
USPC ......... 370/390, 350, 351, 389, 392, 396, 397, 370/400, 401, 409, 395.2, 395.21, 395.3, 370/395.31, 395.32
See application file for complete search history.

(56) References Cited

U.S. PATENT DOCUMENTS

| | | | |
|---|---|---|---|
| 6,353,614 B1 * | 3/2002 | Borella et al. | 370/389 |
| 2010/0189117 A1 * | 7/2010 | Gowda et al. | 370/401 |
| 2011/0261828 A1 | 10/2011 | Smith | |
| 2012/0072564 A1 * | 3/2012 | Johnsen | H04L 12/462 709/223 |
| 2012/0233492 A1 | 9/2012 | Finn et al. | |
| 2012/0287930 A1 | 11/2012 | Raman | |
| 2013/0188645 A1 * | 7/2013 | Mack-Crane | H04L 12/4625 370/392 |
| 2013/0266019 A1 * | 10/2013 | Qu et al. | 370/395.53 |
| 2014/0044126 A1 * | 2/2014 | Sabhanatarajan | H04L 45/02 370/354 |

OTHER PUBLICATIONS

M. Sridharan, et al., "NVGRE: Network Virtualization Using Generic Routing Encapsulation," Network Working Group, Internet-Draft, Sep. 2011, 19 pages; http://tools.ietf.org/pdf/draft-sridharan-virtualization-nvgre-00.pdf.
M. Mahalingam, et al., "VXLAN: A Framework for Overlaying Virtualized Layer 2 Networks Over Layer 3 Networks," Network Working Group, Internet Draft, Aug. 26, 2011, 20 pages; http://tools.ietf.org/pdf/draft-mahalingam-dutt-dcops-vxlan-00.pdf.

\* cited by examiner

*Primary Examiner* — Mark Rinehart
*Assistant Examiner* — Kenneth P Hunt
(74) *Attorney, Agent, or Firm* — Patent Capital Group

(57) ABSTRACT

A method is provided in one example embodiment and includes determining a source of a packet received at a network element and characterizing a link on which the packet was received. The method further includes forwarding the packet to an overlay network and locally connected hosts other than a source of the packet if the source of the packet is a local host and the link is a local link; forwarding the packet to hosts that are not dually-connected to the network element if the source of the packet is the local host and the link is a core link; and forwarding the packet as indicated in a multicast tree if the source of the packet is a non-local host and the link is a core link.

20 Claims, 5 Drawing Sheets

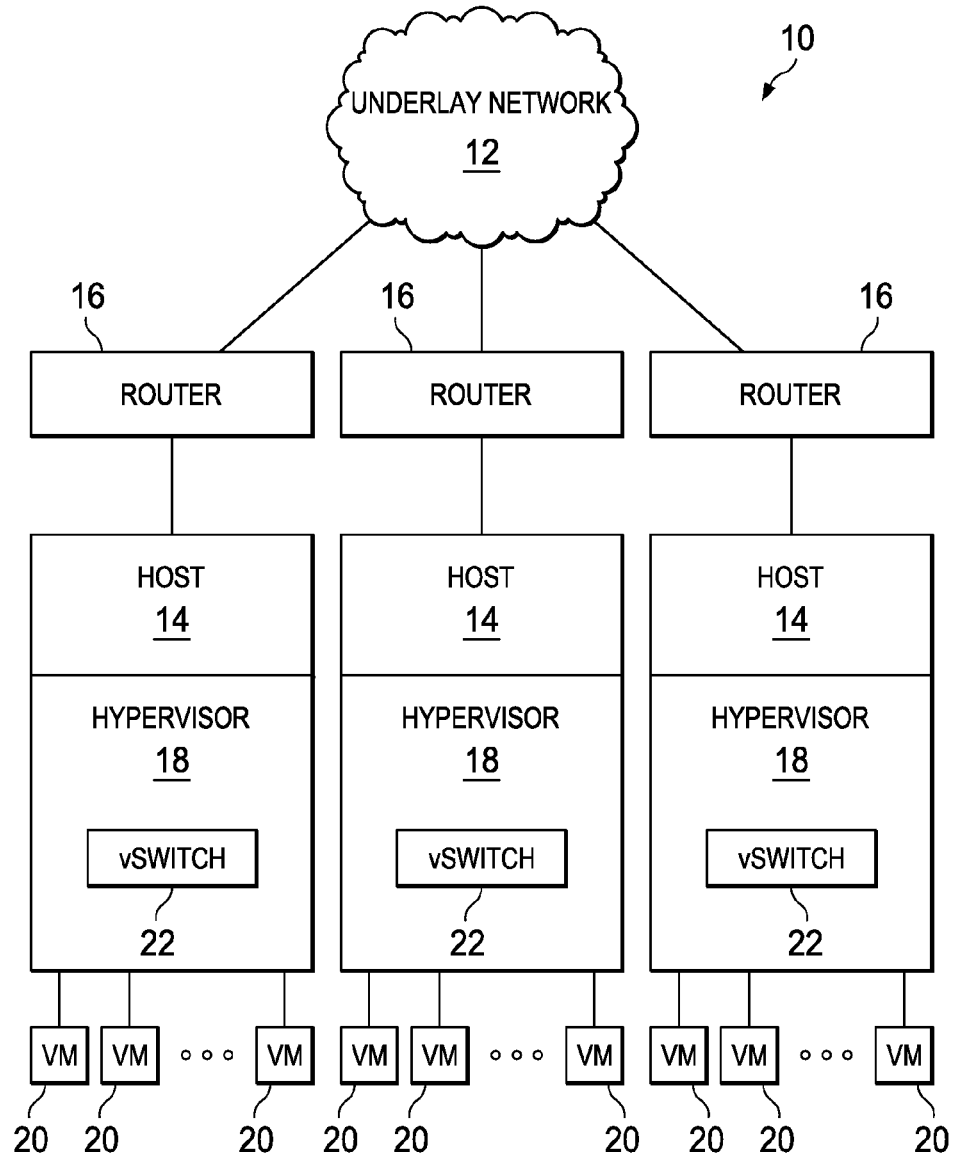

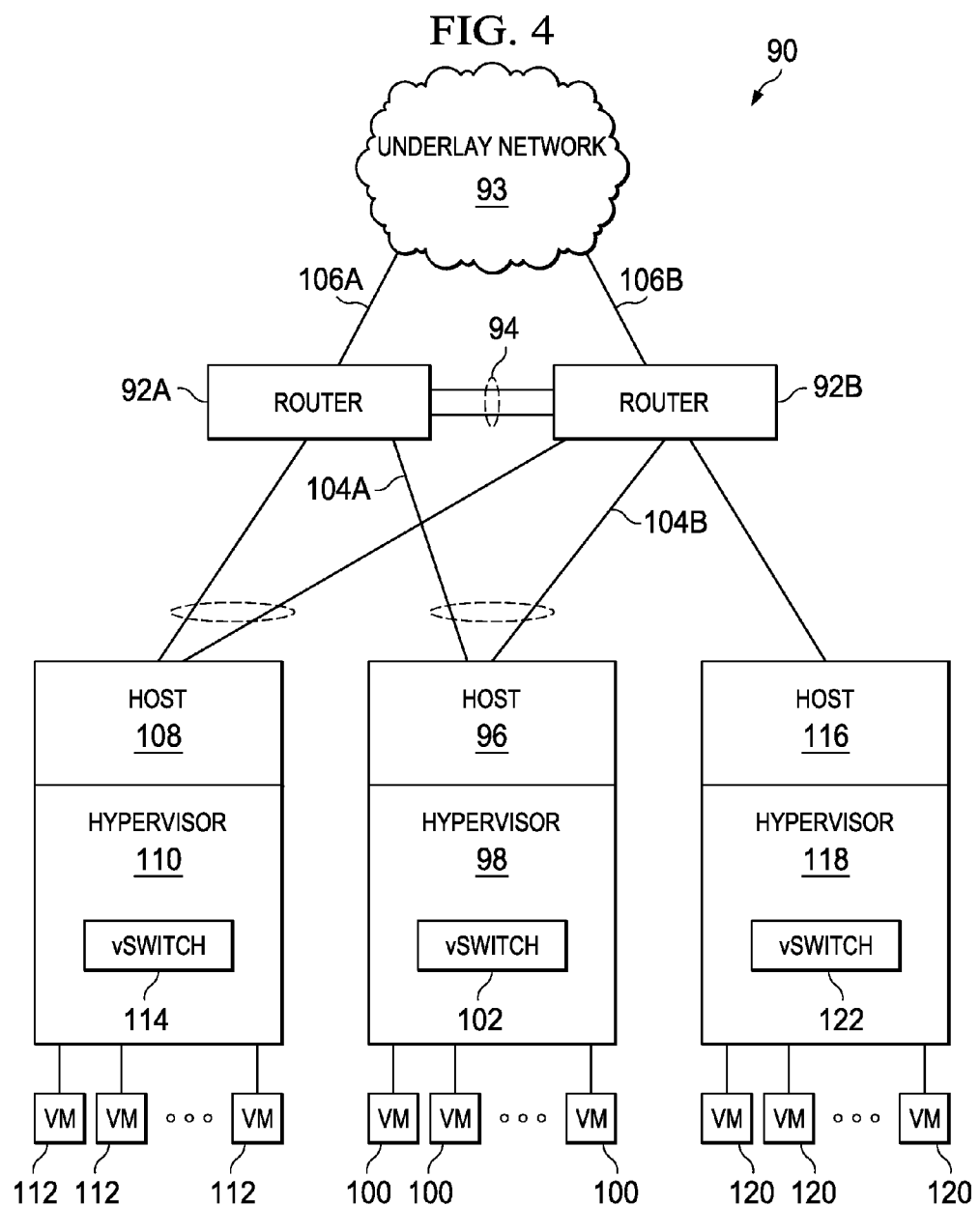

SOURCE IP-BASED PRUNING OF TRAFFIC TOWARD DUALLY-CONNECTED OVERLAY HOSTS IN A DATA COMMUNICATIONS ENVIRONMENT

TECHNICAL FIELD

This disclosure relates generally to overlay networks and, more particularly, to techniques for performing source IP-based pruning of traffic toward dually-connected overlay hosts in a data communications environment.

BACKGROUND

In general, an overlay network is a network built on top of another, underlying, network. Nodes in the overlay network are interconnected by virtual or logical links, each of which corresponds to a path comprising one or more physical links in the underlying network. Distributed systems such as cloud computing networks and peer-to-peer networks are overlay networks because their nodes run on top of the Internet. Overlay networks in general, and Internet protocol ("IP") overlay networks in particular, are gaining popularity for providing virtual machine ("VM") mobility over layer 3 ("L3") networks, such as Virtual Extensible Local Area Networks ("VXLANs") and Network Virtualization using Generic Routing Encapsulation ("NVGRE")-based networks, for example. In such overlay networks, inner layer 2 ("L2") or L3 frames are encapsulated within an outer IP overlay encapsulation. Overlay encapsulation may begin on a virtual switch ("vSwitch") executing within a hypervisor of a virtualized host server. In some instances, the hypervisor may be connected to two nodes, or routers, in accordance with Virtual PortChannel ("vPC") technology. vPC enables links that are physically connected to two different nodes, referred to as "vPC peers," to appear as a single PortChannel to the overlay network.

One common practice for distributing multi-destination traffic in an overlay network is to use multicast encapsulation on the outer header, with a vSwitch, which may be implemented as a VXLAN Tunnel End Point ("VTEP"), sending an Internet Group Management Protocol ("IGMP") "join" message toward the overlay network via one of the vPC peers without participating in the network multicast routing protocol (which may be, for example, Protocol Independent Multicast ("PIM")). Hypervisors, in such topologies can dually actively connecting into the fabric via a port channel, the term used as virtualPortChannel (or vPC) here. When hypervisors are dually connected, multi-destination traffic originated by VTEP (on hypervisor) may be sent back to the hypervisor by the other vPC peer; that is, the vPC peer that did not inject the traffic into the overlay network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1A is a simplified block diagram of a data communications environment implemented utilizing an overlay network in accordance with one embodiment;

FIG. 4 is another block diagram of a system for implementing source IP-based pruning of traffic toward dually-connected overlay hosts in a data communications environment in accordance with one embodiment.

DETAILED DESCRIPTION OF EXAMPLE EMBODIMENTS

Overview

Figures 1B, 5:
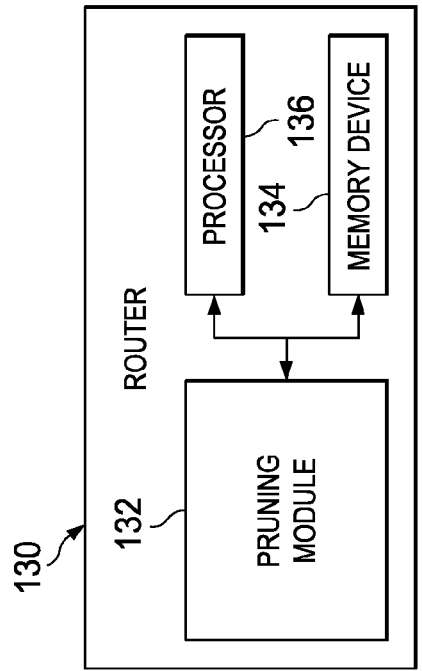
FIG. 1B illustrates a format of a VXLAN-encapsulated data frame in accordance with one embodiment.
FIG. 5 is a block diagram illustrating a network node for implementing source IP-based pruning of traffic toward dually-connected overlay hosts in a data communications environment in accordance with one embodiment.

A method is provided in one example embodiment and includes determining (e.g., identifying, evaluating, establishing, resolving, analyzing, processing data to decide, etc.) a source of a packet received at a network element and characterizing a link on which the packet was received. The method further includes forwarding (e.g., sending, communicating, etc.) the packet to an overlay network and locally connected hosts other than a source of the packet if the source of the packet is a local host and the link is a local link; forwarding the packet to hosts that are not dually-connected to the network element if the source of the packet is the local host and the link is a core link; and forwarding the packet as indicated in a multicast tree if the source of the packet is a non-local host and the link is a core link.

Example Embodiments

The following discussion references various embodiments. However, it should be understood that the disclosure is not limited to specifically described embodiments. Instead, any combination of the following features and elements, whether related to different embodiments or not, is contemplated to implement and practice the disclosure. Furthermore, although embodiments may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any subject matter disclosed herein and shall not be considered to be an element or limitation of the appended claims except where explicitly recited in a claim(s).

As will be appreciated, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, aspects of the present disclosure may take the form of a computer program product embodied in one or more non-transitory computer readable medium(s) having computer readable program code encoded thereon.

Any combination of one or more non-transitory computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or "Flash memory"), an optical fiber, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java™, Smalltalk™ C++ or the like and conventional procedural programming languages, such as the "C" programming language or similar programming languages.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be described in greater detail below, in one embodiment, an approach is presented for identifying locally-connected virtualized hosts and pruning traffic toward dually-connected hosts. To this end, data centers have traditionally used VLANs to enforce L2 isolation. As data centers have continued to grow, the need for extending L2 networks across or beyond a data center renders the limitations of VLANs in certain regards more obvious and difficult to accommodate. Such limitations include the fact that, in a data center, thousands of VLANs are required to partition traffic in a multi-tenant environment sharing the same L2/L3 infrastructure for a cloud service provider; the current limit of 4096 VLANs, some of which are reserved, is clearly insufficient to meet this need. Additionally, due to host virtualization, each VM requires a unique MAC address and IP address. This results in thousands of MAC table entries on upstream switches, which places heavy, and often unreasonable, demands on the table capacity of those switches. Moreover, VLANs are highly restrictive in terms of distance and deployment and while VLAN Trunk Protocol ("VTP") can be used to deploy VLANs across L2 switches, most users prefer to disable VTP due to its potentially destructive nature. Finally, using Spanning Tree Protocol ("STP") to provide L2 loop free topology disables most redundant links; as a result, Equal-Cost Multi-Path ("ECMP"), while easy to achieve in an IP network, may be difficult to achieve using VLANs.

VXLAN, which is currently the most popular virtualization solution for data centers, addresses many of the challenges discussed above with respect to VLANs. In particular, VXLAN technology is designed to provide the same services to devices connected to Ethernet end systems that VLANs do. In addition, VXLAN provides a means by which to extend an L2 network over a L3 network. In a VXLAN environment, a VXLAN Tunnel Endpoint ("VTEP") connects the vSwitch of a virtualized host server to the IP network; the VTEP is disposed within the hypervisor that manages the VMs. The VMs themselves are unaware of both VXLAN and the function of the VTEP, which is to encapsulate the VM traffic within an IP header (to create a VXLAN packet) to send across an IP network. An important aim of VXLAN is to enable dynamic large scale isolated virtual L2 networks to be created for virtualized and multi-tenant environments by encapsulating frames in VXLAN packets.

Referring now to FIG. 1A, shown therein is a simplified block diagram of a data communications system 10 implemented utilizing an underlay network 12 in accordance with one embodiment. In one embodiment, system 10 is a data center. As shown in FIG. 1A, several virtualized host servers, represented by host servers 14, are connected to the underlay network 12 either directly or via one or more routers, collectively represented in FIG. 1A by routers 16. Each of hosts 14 has installed thereon a hypervisor 18 for managing one or more VMs 20 instantiated on the host.

It will be assumed for the sake of example herein that the underlay network 12 is an Internet protocol ("IP") network and as such includes a number of network devices that communicate using IP. Such network devices may include, for example, computers, servers, network appliances, hosts, routers, switches, gateways, bridges, virtual equipment, loadbalancers, firewalls, processors, modules, or any other suitable device, component, element, or object operable to exchange information in a communications environment. Moreover, the network devices may include any suitable hardware, software, components, modules, interfaces, or objects that facilitate the operations thereof. This may be inclusive of appropriate algorithms and communication protocols that allow for the effective exchange of data or information. Additionally, it will be assumed for the sake of example that system 10 is implemented using VXLAN. However, it should be noted that other types of overlay networks and implementing technologies (such as NVGRE) may be employed and implemented using the teachings described herein without departing the spirit or scope of the embodiments. Accordingly, each hypervisor 18 includes a VTEP 22 for performing VXLAN encapsulation/decapsulation, as described in greater detail below.

As previously noted, in one embodiment, VXLAN encapsulation may be used; however, it will be understood that other encapsulation techniques, such as NVGRE and others, may be employed without departing from the spirit or scope of the embodiments described herein. In general, VXLAN utilizes IP-based encapsulation and provides for a virtual L2 network. FIG. 1B illustrates the format of a VXLAN frame. In VXLAN, an original packet is carried as the payload of a UDP packet comprising the VXLAN frame. As previously noted, frame encapsulation is performed by the VTEP, which has an uplink interface and a downlink interface. The uplink interface receives VLXAN frames and functions as a tunnel endpoint with an IP address used for routing VXLAN encapsulated frames. The functionality of a VTEP can be implemented in software (as a vSwitch, for example) or in the form a physical switch. It should be noted that each VM can connect into a hypervisor via multiple virtual Network Interface Card ("vNIC") connections, such that one VM can connect using multiple links into the vSwitch.

VXLAN frames are sent to the IP address assigned to the destination VTEP specified in the Outer IP DA field. The IP address of the source VTEP is specified in the Outer IP SA field. Packets received on the uplink are mapped from the VXLAN ID identified in a 24-bit VXLAN ID field of the VXLAN frame to a VLAN and the original Ethernet frame payload may optionally be sent as an 802.1Q Ethernet frame on the downlink. During this process, the inner MAC SA and VXLAN ID specified in the respective fields of the VLXAN frame are learned in a local table of the switch. Packets received on the downlink are mapped to a VXLAN ID using the VLAN of the frame. A lookup is then performed within the VTEP L2 table using the VXLAN ID and destination MAC; this lookup provides the IP address of the destination VTEP. The frame is then encapsulated and sent out the uplink interface.

In a conventional L2 switch, "flood-and-learn" is employed for reaching unknown destinations. Specifically, when a switch receives a frame for an unknown destination, (i.e., there is no MAC for the destination in its MAC table), it will flood the frame to all ports except the one on which it was received. Eventually, the frame will reach the intended destination, which will send a response to the switch. Upon receipt of the response, the MAC is learned and written to the MAC table of the switch. VXLAN mimics this behavior over an IP underlay network through use of IP multicast groups, which provides a means by which to distribute a packet to a group. In particular, each VXLAN ID has an assigned IP multicast group to use for traffic flooding; the multicast group may not be unique to a particular VXLAN ID and may be shared across VXLAN IDs. When a frame is received on the downlink bound for an unknown destination, the frame is encapsulated using the IP address of the assigned multicast group as the Outer IP DA and then sent out on the uplink. Any VTEP with switches on that VXLAN ID will have joined the multicast group and therefore receive the frame, thus maintaining the "flood-and-learn" behavior.

Figure 2:
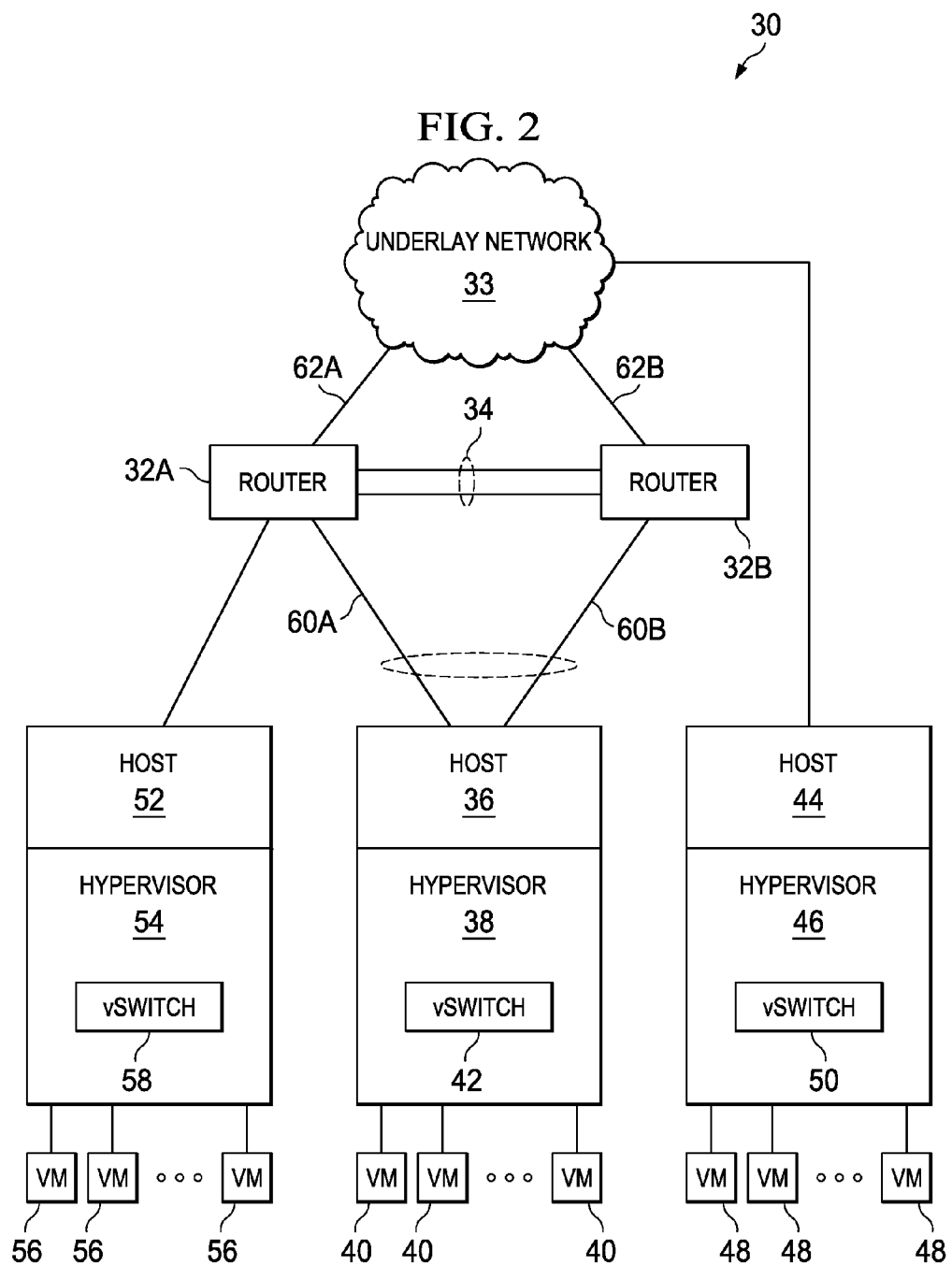
FIG. 2 is a block diagram of a system for implementing source IP-based pruning of traffic toward dually-connected overlay hosts in a data communications environment in accordance with one embodiment.

Turning now to FIG. 2, illustrated therein is a block diagram of a system 30 for implementing source IP-based pruning of traffic toward dually-connected overlay hosts in a data communications environment in accordance with one embodiment. As shown in FIG. 2, system 30 includes two routers 32A, 32B, connected to an underlay network 33. In the illustrated embodiment, routers 32A, 32B, are implemented as transit routers that are vPC peers connected via a peer link 34. A virtualized host server 36 is dually-connected to the two vPC peers 32A, 32B, as is typical in vPC access connectivity, for access to IP underlay network 33. As noted above, vPC enables links that are physically connected to two different nodes, or vPC peers, to appear as a single PortChannel to the overlay network.

In one embodiment, host server 36 includes a hypervisor 38 for managing multiple VMs 40 instantiated on the server 26. Hypervisor 38 includes a vSwitch 42 for originating overlay encapsulation of frames received from the VMs 40. Specifically, the vSwitch 42 can send multi-destination frames by encapsulating VM frames in an outer multicast group. In one embodiment, the vSwitch comprises a VTEP for encapsulating frames from the VMs 40 as VXLAN frames. A remote (or "non-local") virtualized host server 44 may also be connected to IP underlay network 33 either directly or via a router (not shown). Similar to the host server 36, remote host server 44 includes a hypervisor 46 for managing multiple VMs 48 instantiated thereon. Hypervisor 46 also includes a vSwitch 50, which in one embodiment is implemented as a VTEP, for originating overlay encapsulation of frames received from VMs 48. In one embodiment, vSwitch 50 encapsulates the VM frames as VXLAN frames.

Additional virtualized host servers may be singly-connected to routers 32A, 32B. For example, as illustrated in FIG. 2, a local virtualized host server 52 is connected to the router 32A. As with the host servers 36 and 44, the host server 52 includes a hypervisor 54 for managing multiple VMs 56 instantiated thereon. The hypervisor 54 may also include a vSwitch 58, which in one embodiment is implemented as a VTEP, for originating overlay encapsulation of frames received from the VMs 56. In one embodiment, the vSwitch 58 encapsulates the VM frames as VXLAN frames.

In FIG. 2, links 60A and 60B, as well as the corresponding ports of the routers 32A, 32B, to which those links connect, are designated as "local." Links 62A and 62B, as well as the corresponding ports of the routers 32A, 32B, to which those links connect, are designated as "core." As previously noted, it is common to use multicast groups in VXLAN to mimic the "flood-and-learn" behavior of L2 networks. In the case of system 30, in which the host server 36 is dually-connected via vPC, this can result in certain complications. For example, assume that the host server 36 forwards a packet to the router 32A to be flooded onto the network 33. While the packet will not subsequently be received by the router 32A, it will be received by the vPC peer node (router 32B), which will forward the packet back to the host server 36. Clearly, this is undesirable and results in a waste of resources. Accordingly, embodiments described herein provide a system in which source IP-based pruning of traffic toward dually-connected overlay hosts is performed.

In accordance with features of one embodiment, when an incoming frame is received by the router on a core link, a determination is made from the source IP address of the incoming multi-destination frame (based on the outer source IP address) whether the source of the frame is local or remote. If the source is local, the traffic is not forwarded to vPC- (dually-) connected hosts. An exception to the rule is applied if the multi-destination frame arrives at the router on a local link; this frame is not prevented from being sent to vPC-connected hosts, as such traffic is destined for the IP overlay network via a core link.

Referring to FIG. 2, upon receipt of a frame originating from one of the VMs 40, the host server 36 (and more particularly, the vSwitch 42) encapsulates the frame into an outer multicast group and sets the source address to the local address of the host server. The host server 36 then sends the encapsulated frame to the one of the routers 32A, 32B. It will be assumed for the sake of example that the packet comprising the encapsulated frame is sent to the router 32A. It will be noted that the decision to send the frame to one or the other routers 32A, 32B, may be based on one of any number of different load balancing techniques implemented at the host server 36, such as hashing. The decision may also be based on other factors not related to load balancing. Upon receipt of the packet, router 32A recognizes that the packet has been received on a local link (link 60A) via a local port and, further, permits the multicast packet to be flooded to all multicast group recipients. As will be explained in illustrated in greater detail below, this may include local dually-connected host servers other than host server 36. The router 32A sends the frame up the multicast tree and the frame eventually arrives at router 32B. In accordance with features of embodiments described herein, router 32B recognizes that the packet has arrived on a core link (link 62B) via a core port, examines the source IP address of the frame and recognizes that the address belongs to host server 36. As a result, router 32B selects a multi-destination distribution list that excludes local dually-connected hypervisors. In other words, the packet is not forwarded to the host server 36. The "local" attribute for a link/port, and for source-IP address lookup, may be programmed based on user configuration, orchestration, and control protocol exchange within the IP fabric comprising underlay network 33.

Figure 3:
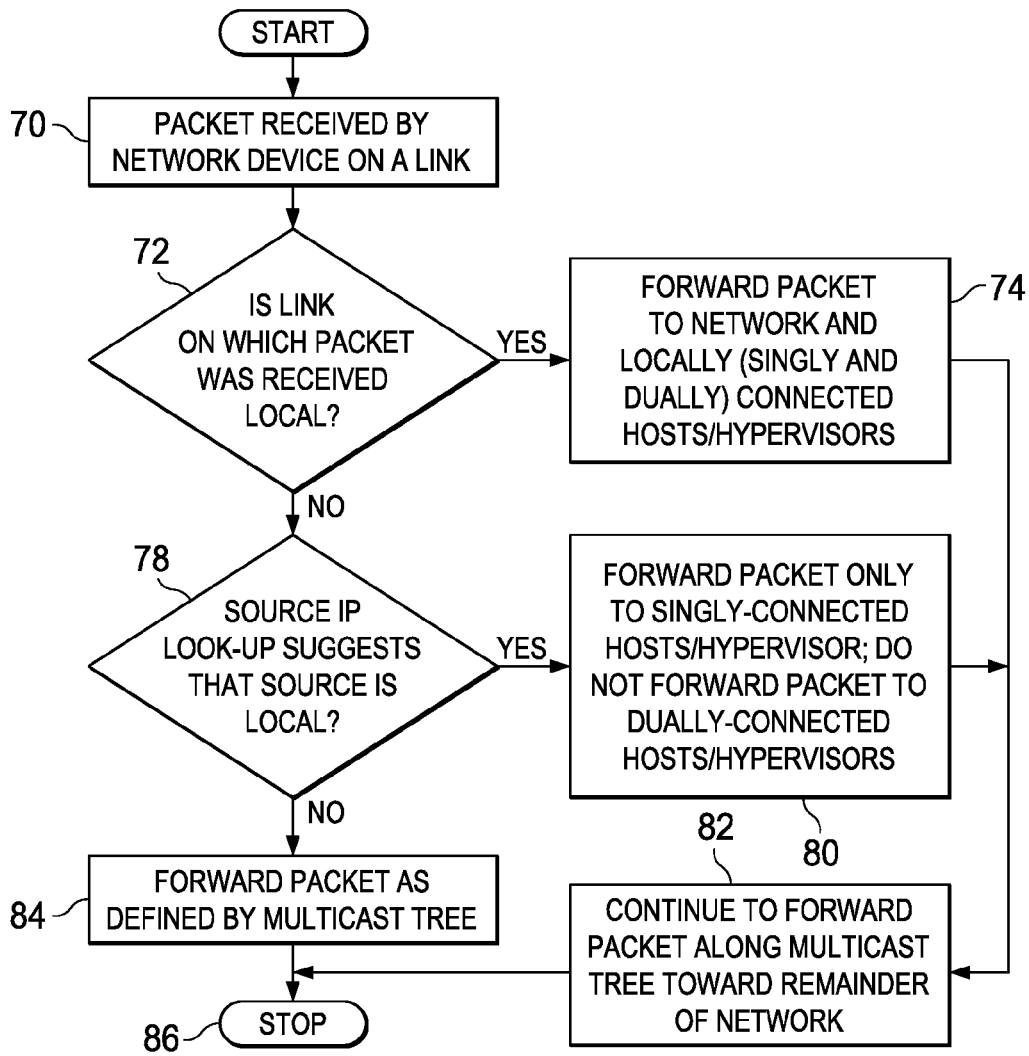
FIG. 3 is a flowchart illustrating a method for implementing source IP-based pruning of traffic toward dually-connected overlay hosts in a data communications environment in accordance with one embodiment.

Turning now to FIG. 3, which is a flowchart illustrating a method for implementing source IP-based pruning of traffic toward dually-connected overlay hosts in a data communications environment in accordance with one embodiment, in step an overlay encapsulated packet is received at a router via a link. In step 70, a packet is received at a router. In step 72, a determination is made whether the link on which the packet was received is a local link, as opposed to a core link. In particular, if the packet was received from a host connected to the router, then the packet was received on a local link via a local port. In contrast, if the packet was received from the network, then the packet was received on a core link via a core port. In one embodiment, a table identifying a particular link (by a link ID) as local or not is maintained on the router. If it is determined in step 72 that the link on which the packet was received is a local link, meaning that it was received from a host connected directly to the router, execution proceeds to step 74. In step 74, the packet is forwarded to the network, as well as local (dually and singly) connected hosts other than the host from which the packet was received (i.e., the host connected to the router via the local link).

Returning to step 72, if it is determined that the packet was not received on a local link, meaning that the packet was received on a core link from the network, execution proceeds to step 78, in which a source-IP lookup is performed. In particular, in step 78, a determination is made whether the source IP address included in the overlay packet is that of a local host. If the source-IP address is that of a local host, in step 80, the packet is forwarded to singly-connected hosts only; the packet is not forwarded to dually-connected hosts. In this manner, the embodiments avoid returning to the host packets that it originally sent out via a peer node. Upon completion of step 74 or 80, execution proceeds to step 82, in which the packet is forwarded along the multicast tree toward the remainder of the network. If it is determined in step 78 that the source-IP address is not that of a local host, in step 82, the packet is forwarded as indicated in the multicast tree, which may include forwarding to both singly- and dually-connected hosts. Upon completion of either step 82 or 84, execution terminates in step 86.

Operation of the method illustrated in the flowchart will now be described in greater detail using an embodiment illustrated in FIG. 4 as the basis for example. FIG. 4 is a block diagram of a system 90 for implementing source IP-based pruning of traffic toward dually-connected overlay hosts in a data communications environment in accordance with one embodiment. As shown in FIG. 4, the system 90 includes two routers 92A, 92B, connected to an underlay network 93. In the illustrated embodiment, the routers 92A, 92B, are implemented as transit routers that are vPC peers connected via a peer link 94. A virtualized host server 96 is dually-connected to the two vPC peers 92A, 92B, as is typical in vPC access connectivity, for access to the IP underlay network 93. As noted above, vPC enables links that are physically connected to two different nodes, or vPC peers, to appear as a single PortChannel to the network. In one embodiment, the host server 96 includes a hypervisor 98 for managing multiple VMs 100 instantiated on the server 96. The hypervisor 98 includes a vSwitch 102 for originating overlay encapsulation of frames received from the VMs 100. Specifically, the vSwitch 102 can send multi-destination frames by encapsulating VM frames in an outer multicast group. In one embodiment, the vSwitch comprises a VTEP for encapsulating frames from the VMs 100 as VXLAN frames. As illustrated in FIG. 4, the routers 94A and 94B are connected to the host server 96 via local links 104A, 104B, and to the underlay network 93 via core links 106A, 106B.

A second virtualized host server 108 may also be dually-connected to the vPC peers 92A, 92B. Similar to the host server 96, the remote host server 108 includes a hypervisor 110 for managing multiple VMs 112 instantiated thereon. The hypervisor 110 also includes a vSwitch 114, which in one embodiment is implemented as a VTEP, for originating overlay encapsulation of frames received from the VMs 112. In one embodiment, the vSwitch 114 encapsulates the VM frames as VXLAN frames. Additional virtualized host servers may be singly-connected to routers 92A, 92B. For example, as illustrated in FIG. 4, a virtualized host server 116 is connected to the router 92B. As with the host servers 96 and 108, the host server 116 includes a hypervisor 118 for managing multiple VMs 120 instantiated thereon. The hypervisor 118 may also include a vSwitch 122, which in one embodiment is implemented as a VTEP, for originating overlay encapsulation of frames received from the VMs 120. In one embodiment, the vSwitch 122 encapsulates the VM frames as VXLAN frames. Although not shown, it will be recognized that remote host servers may be connected to the network 93 either directly or via a router or other network device.

In FIG. 4, links 104A and 104B, as well as the corresponding ports of the routers 92A, 92B, to which those links connect, are designated as "local." Links 106A and 106B, as well as the corresponding ports of the routers 92A, 92B, to which those links connect, are designated as "core."

Referring now to FIGS. 3 and 4 in concert, it will be assumed for the sake of example that the host server 96 receives a frame from one of the VMs 100. The host server 96, or more particularly, the vSwitch 102, encapsulates the received frame into an outer multicast group and sets the source address in the multicast header as local address of the host server. The host server 96 forwards the encapsulated multicast packet to the router 92A, via the link 104A. As previously noted, selection of router 92A may be performed in accordance with an appropriate load balancing or other technique and may be as simple as performing a hashing operation at the host server 96. Upon receipt of the multicast packet (FIG. 3, step 70), the router 92A determines whether the link on which the packet was received (link 104A) is local (FIG. 3, step 72). Responsive to a determination that the link 104A is local, the router 92A floods the packet to remote recipients via the underlay network 93 and to local recipients, including dually-connected hosts other than the host server 96, such as the host server 108 (FIG. 3, step 74).

When the packet subsequently arrives at the router 92B via the link 104B, the router 92B determines whether the link on which the packet was received is local (FIG. 3, step 70). Responsive to a determination that the link 106B is not local (i.e., the link is a core link), the router 92B performs a source IP lookup (FIG. 3, step 78). In the illustrated example, the source IP lookup will be successful and determined to be local, because the source of the packet is a local dually-connected host server. As a result, the packet is not forwarded to recipients in the multicast group; rather, it is forwarded only to singly connected hosts (FIG. 3, step 80), such as host server 116. It will be recognized that the packet should not be forwarded to dually-connected host server 108 because that server has already received the packet from the router 92A. Assuming for the sake of example that the source IP lookup is not successful (i.e., the source of the packet is a remote host server), the packet will be forwarded as defined by the multicast tree (FIG. 3, step 82).

In one example implementation, various nodes involved in implementing the embodiments described herein can include software for achieving the described functions. For example, referring to FIG. 5, each of the routers of the embodiments described herein, represented in FIG. 5 by a router 130, may include a pruning module 132, which comprises software embodied in one or more tangible media for facilitating the activities described herein. Router 130 may also include a memory device 134 for storing information to be used in achieving the functions as outlined herein. Additionally, router 130 may include a processor 136 that is capable of executing software or an algorithm (such as embodied in module 132) to perform the functions as discussed in this Specification.

It should be noted that much of the infrastructure discussed herein can be provisioned as part of any type of network device. As used herein, the term "network device" can encompass computers, servers, network appliances, hosts, routers, switches, gateways, bridges, virtual equipment, load-balancers, firewalls, processors, modules, or any other suitable device, component, element, or object operable to exchange information in a communications environment. Moreover, the network devices may include any suitable hardware, software, components, modules, interfaces, or objects that facilitate the operations thereof. This may be inclusive of appropriate algorithms and communication protocols that allow for the effective exchange of data or information.

In one implementation, these devices can include software to achieve (or to foster) the activities discussed herein. This could include the implementation of instances of any of the components, engines, logic, modules, etc., shown in the FIGURES. Additionally, each of these devices can have an internal structure (e.g., a processor, a memory element, etc.) to facilitate some of the operations described herein. In other embodiments, the activities may be executed externally to these devices, or included in some other device to achieve the intended functionality. Alternatively, these devices may include software (or reciprocating software) that can coordinate with other elements in order to perform the activities described herein. In still other embodiments, one or several devices may include any suitable algorithms, hardware, software, components, modules, interfaces, or objects that facilitate the operations thereof.

Note that in certain example implementations, functions outlined herein may be implemented by logic encoded in one or more non-transitory, tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element, as may be inherent in several devices illustrated in the FIGURES, can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor, as may be inherent in several devices illustrated in FIGS. 1-4, including, for example, servers, fabric interconnects, and virtualized adapters, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

The devices illustrated herein may maintain information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the computer elements can also include suitable interfaces for receiving, transmitting, and/or otherwise communicating data or information in a communications environment.

Note that with the example provided above, as well as numerous other examples provided herein, interaction may be described in terms of two, three, or four computer elements. However, this has been done for purposes of clarity and example only. In certain cases, it may be easier to describe one or more of the functionalities of a given set of flows by only referencing a limited number of system elements. It should be appreciated that systems illustrated in the FIGURES (and their teachings) are readily scalable and can accommodate a large number of components, as well as more complicated/sophisticated arrangements and configurations. Accordingly, the examples provided should not limit the scope or inhibit the broad teachings of illustrated systems as potentially applied to a myriad of other architectures.

It is also important to note that the steps in the preceding flow diagrams illustrate only some of the possible signaling scenarios and patterns that may be executed by, or within, the illustrated systems. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the illustrated systems in that any suitable arrangements, chronologies, configurations, and timing mechanisms may be provided without departing from the teachings of the present disclosure. Although the present disclosure has been described in detail with reference to particular arrangements and configurations, these example configurations and arrangements may be changed significantly without departing from the scope of the present disclosure.

Numerous other changes, substitutions, variations, alterations, and modifications may be ascertained to one skilled in the art and it is intended that the present disclosure encompass such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    determining a source of a packet received at a network element and characterizing a link on which the packet was received as one of a local link and a core link;
    forwarding the packet only to an overlay network and locally connected hosts other than a source of the packet if the source of the packet is a local host and the link is characterized as a local link;
    forwarding the packet only to hosts that are not dually-connected to the network element if the source of the packet is the local host and the link is characterized as a core link; and
    forwarding the packet only as indicated in a multicast tree if the source of the packet is a non-local host and the link is characterized as a core link,
    wherein a plurality of hosts are dually-connected to the network element.

2. The method of claim 1, wherein the source of the packet is dually-connected to the network element and a second network element.

3. The method of claim 2, wherein the first and second network elements comprise virtual PortChannel ("vPC") peers connected via a peer connection.

4. The method of claim 1, wherein the packet comprises a native frame that has been encapsulated by a virtual switch (vSwitch) installed on the source.

5. The method of claim 4, wherein the vSwitch comprises a Virtual Extensible Local Area Network Tunnel End Point ("VTEP").

6. The method of claim 1, wherein the determining comprises checking a source IP field of the packet.

7. One or more non-transitory tangible media that includes code for execution and when executed by a processor is operable to perform operations comprising:
    determining a source of a packet received at a network element and characterizing a link on which the packet was received as one of a local link and a core link;
    forwarding the packet only to an overlay network and locally connected hosts other than a source of the packet if the source of the packet is a local host and the link is characterized as a local link;
    forwarding the packet only to hosts that are not dually-connected to the network element if the source of the packet is the local host and the link is characterized as a core link; and
    forwarding the packet only as indicated in a multicast tree if the source of the packet is a non-local host and the link is characterized as a core link,
    wherein a plurality of hosts are dually-connected to the network element.

8. The media of claim 7, wherein the source of the packet is dually-connected to the network element and a second network element.

9. The media of claim 7, wherein the first and second network elements comprise virtual PortChannel ("vPC") peers connected via a peer connection.

10. The media of claim 7, wherein the packet comprises a native frame that has been encapsulated by a virtual switch (vSwitch) installed on the source.

11. The media of claim 10, wherein the vSwitch comprises a Virtual Extensible Local Area Network Tunnel End Point ("VTEP").

12. The media of claim 7, wherein the determining comprises checking a source IP field of the packet.

13. The media of claim 7, wherein the source is a host server that includes a hypervisor for managing multiple virtual machines (VMs).

14. An apparatus comprising:
    a memory element configured to store data;
    a processor operable to execute instructions associated with the data; and
    a pruning module configured to:
        determine a source of a packet received at a network element and characterizing a link on which the packet was received as one of a local link and a core link;
        forward the packet only to an overlay network and locally connected hosts other than a source of the packet if the source of the packet is a local host and the link is characterized as a local link;

forward the packet only to hosts that are not dually-connected to the network element if the source of the packet is the local host and the link is characterized as a core link; and forward the packet only as indicated in a multicast tree if the source of the packet is a non-local host and the link is characterized as a core link, wherein a plurality of hosts are dually-connected to the network element.

15. The apparatus of claim 14, wherein the source of the packet is dually-connected to the network element and a second network element.

16. The apparatus of claim 15, wherein the first and second network elements comprise virtual PortChannel ("vPC") peers connected via a peer connection.

17. The apparatus of claim 14, wherein the packet comprises a native frame that has been encapsulated by a virtual switch (vSwitch) installed on the source.

18. The apparatus of claim 17, wherein the vSwitch comprises a Virtual Extensible Local Area Network Tunnel End Point ("VTEP").

19. The apparatus of claim 14, wherein the source comprises a hypervisor for supervising operation of at least one virtual machine ("VM") instantiated on the host.

20. The apparatus of claim 14, wherein the network element comprises a router coupled to at least one host server that includes a hypervisor for managing multiple virtual machines (VMs).

* * * * *